US008316420B2

(12) United States Patent
Buchwald et al.

(10) Patent No.: US 8,316,420 B2
(45) Date of Patent: Nov. 20, 2012

(54) ACCESS CONTROL ON DYNAMICALLY INSTANTIATED PORTAL APPLICATIONS

(75) Inventors: Jan Buchwald, Boeblingen (DE); Dieter Buehler, Tuebingen (DE); Sybille Kurz, Boeblingen (DE); Holger Waterstrat, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 12/211,860

(22) Filed: Sep. 17, 2008

(65) Prior Publication Data
US 2009/0133100 A1 May 21, 2009

(30) Foreign Application Priority Data
Nov. 21, 2007 (EP) .................................... 07121169

(51) Int. Cl.
*H04L 29/06* (2006.01)
(52) U.S. Cl. ............................................... 726/4; 726/3
(58) Field of Classification Search .................. None
See application file for complete search history.

(56) References Cited

U.S. PATENT DOCUMENTS

| 7,451,477 B2 * | 11/2008 | Griffin et al. ............... 726/1 |
| 2003/0163513 A1 * | 8/2003 | Schaeck et al. .............. 709/201 |
| 2004/0230679 A1 * | 11/2004 | Bales et al. .................. 709/225 |
| 2008/0134320 A1 * | 6/2008 | Desai et al. .................. 726/21 |

OTHER PUBLICATIONS

WebSphere Portal for z/OS—Security Guide, IBM, 2005, pp. 69-98.*

* cited by examiner

*Primary Examiner* — Minh Dinh
(74) *Attorney, Agent, or Firm* — Daniel McLoughlin; Hoffman Warnick LLC

(57) ABSTRACT

The present invention relates to a method and system for controlling access rights to dynamically instantiated portal applications in a portal environment, wherein new instances of a portal application and respective access control information on resources used in the application are generated dynamically from an automated programmed mechanism, and wherein a user-application role mapping is demanded for the portal application by a respective runtime access control function implemented at the portal environment. The method includes: assigning an individual user-to-application role mapping to a respective individual one of the created instances of the portal application, wherein for each incoming user request to one of the created instances the runtime access control function checks a target application instance identifier, which identifies an individual application instance desired to be addressed by the incoming request; and granting access rights to incoming user requests according to the application roles as they are defined for the target application instance.

11 Claims, 8 Drawing Sheets

Application Roles

| Application Role Name | Assigned Portal Permissions |
|---|---|
| Visitor | User@Page1, User@Page2, User@PortletA |
| Moderator | Editor@Page1, Editor@Page2, Manager@PortletA |

FIG. 7

Principal to Application Role Mappings

| Application Role | Principal | Application Scope |
|---|---|---|
| Visitor | Alice | Collab App 1' |
| Moderator | Bob | Collab App 1 |
| Visitor | Bob | Collab App 1'' |
| Moderator | Bob | Collab App 1''' |

FIG. 8

Application Roles

| Application Role Name | Assigned Portal Permissions | Base Application Role | Application Scope |
|---|---|---|---|
| Visitor | User@Page1, User@Page2, User@PortletA | Null | Collab App 1 |
| Moderator | Editor@Page1, Editor@Page2, Manager@PortletA | Null | Collab App 1 |
| Visitor' | Null | Visitor | Collab App 1' |
| Moderator' | Null | Moderator | Collab App 1' |
| Visitor'' | Null | Visitor | Collab App 1'' |
| Moderator'' | Null | Moderator | Collab App 1'' |

FIG. 9

Principal to Application Role Mappings

| Application Role | Principal |
|---|---|
| Moderator | Bob |
| Visitor' | Alice |
| Visitor' | Bob |
| Moderator'' | Bob |

FIG. 10

ACCESS CONTROL ON DYNAMICALLY INSTANTIATED PORTAL APPLICATIONS

FIELD OF THE INVENTION

The present invention relates to the field of network portals and in particular to a method and system for controlling access rights to dynamically instantiated portal applications in a portal environment, wherein new instances of a portal application are able to be generated dynamically from an automated programmed mechanism, such as a template based mechanism, and wherein a user-application role mapping is demanded for the portal application by a respective runtime access control function implemented at the portal environment.

RELATED ART

In this field the term "composite application" defines an application hosted on a web portal platform which is built by combining and connecting multiple components such as portlets, wikis, document libraries, and web services, for a particular purpose such as a shop or a virtual team room application. A single portal platform may host multiple instances of the same composite application, for example different team rooms for different associated user communities. Composite applications are built from a template describing the contained components and their set-up and interconnection.

FIG. 1 shows an overview of the components that build up the prior art application infrastructure 11, abbreviated herein also as AI—system architecture, within an overall portal system 10. The application infrastructure comprises:

a templating application infrastructure 13, abbreviated herein also as TAI, that handles templates in the system and the creation of new composite applications;

a composite application infrastructure 15, abbreviated herein also as CAI, that handles application instances 19 during runtime and manages connections and the data flow between the components of an application;

a component registry 27 that manages business components installed in the system; and a portal handler 29 which is a specific local component that manages any portal related artifacts 8 like pages or portlets for the application infrastructure in the portal, and which is used by the instantiation component 17 to create such artifacts during the creation of a new composite application.

The templating application infrastructure (TAI) component 13 manages the templates 23 in the system which contain references to instantiable components in a local list of components 27. As an example, a template for shopping applications could consist of a reference to a document library component which is used to hold the available goods and their descriptions, a shop portlet that lets clients process actual shopping transactions, an invoice business component that handles the payment process, and a blogging component that allows clients to comment on their satisfaction.

The TAI component 13 also creates application instances from the templates via an instantiation component 17, which creates separate instances of the referenced business components, typically by creating or copying individual configurations for these components such that multiple application instances can be created from the same template without interfering with each other.

For the above mentioned sample template, the instantiation 17 would, among other things, create an individual storage compartment in the document library, an individual configuration of the invoice component referring to the bank account and an individual configuration for the shop portlet that is set up to display goods from the created document library and to delegate payment processing to the created invoice component instance.

In particular, the instantiation 17 needs to create the necessary portal artifacts like pages that allow interaction with the created composite application, which is typically done by employing a specific handler 29 that creates those portal artifacts 8 and links them with the business components of the application.

The created composite application instances 19 hold a context 25 that lists the component instances that make up the composite application FIG. 2 shows an overview of the storage components involved in the portal architecture 10 that comprises deployment related code in a deployment component 14 and a runtime environment in one or more runtime containers 12 where the deployed components are executed.

For the composite application context deployed artifacts are:

application components stored in a component registry 18; and templates stored in a template catalog 20.

This data is then referenced by the application's instance specific data 16.

In such a portal environment, a plurality of composite applications (CA) are usually used for providing at least a part of the portal functionality for members of one or more user communities. Herein, an administration user administrates an application-specific membership of a user to an application role.

A portal composite application infrastructure is known from prior art, for example from IBM's WebSphere Portal. Within this portal composite application infrastructure a plurality of N applications are stored in the form of respective application instances. For each of those applications a respective application community is defined. The composite applications may access a database storing the composite application data.

With special reference to the technical problem related to the present invention a portal application, be that a composite application or a single component application, is used by a specific set of portal users called a "community". To become a member of an application community a portal user has to be assigned to at least one application role by a basically application-specific membership manager. Thereafter the user has all permissions and respective access rights to business data as specified by its application role. Typical roles are supervisor, manager, editor, user, etc. But generally, those roles are domain-specific and thus individual for any business.

The application infrastructure provides programmed functions which enable the creation of portal application instances based on predefined templates. A template defines business components and application roles which specify permissions for the included components and parameters which are resolved during the creation of an application instance.

The usage of such parameters allows the configuration of the appearance and the behavior of the created applications. Thus, one template can be used to create multiple flavors of one single application type. Template parameters are also called "points of variability" (POV).

To become a member of an application community a portal user has to be assigned to at least one application role by an application specific membership manager. Thereafter, the user has all permissions specified by this application role. With respect to the above mentioned multiple business components a template is comprised of, and with respect to the plurality of users which are usually equipped with specific rights associated with such business components, it is quite complicated to manage the overall access rights for those composite applications.

It should be further noted that a given template instance is typically instantiated multiple times in the system resulting in multiple application instances of that template. Such an application instance is then stored on the hard disk of the system and is run such as usual programs are run. Those application instances contain distinct application role instances as defined within the template. The membership information for such an application role can be managed individually within each application. A portal user can be in the same application role in many of those composite applications originating for the same template. If a specific user actually needs to be in many of those roles, the corresponding role assignments have to be individually created in prior art within each application instance. Thereby the membership manager has to repeat the same role mapping over and over again. This is a manual task which may lead to configuration errors resulting in undesired, unintended or insufficient role assignments.

With reference to FIG. 3, there is shown a prior art system overview showing the prior art access control for dynamically instantiated applications. The components particularly relevant for the present invention are the collaborative infrastructure 11 and the access control component 32 located both on the portal server. In FIG. 3 the collaborative application 1 denoted by reference sign 34 is a dynamically instantiable application, so the collaborative infrastructure 11 stores only one instance of this application in the database as a persistent data structure. This application is thus referred to as "base application". Further instances of this application 34 are then generated and launched dynamically during runtime by the collaborative infrastructure 11 taking dynamic, transient copies of all resources contained in the application and associating them to a respective dynamic instance of the application, which are denoted as Collab App 1' and Collab App 1" with reference signs 35 and 36, respectively.

Such dynamic application instances 35 and 36 usually make sense for applications that are instantiated very often, when particular instances of an application differ at very few points and have a limited lifetime. Examples are applications for web conferences, where an application instance represents one occurrence of a web conference, including the respective pages and portlets for preparing, running, and documenting the conference, activities, or incident management, both of which can be considered as temporary collections of documents and information about a particular topic, where an application instance may provide the necessary page structure and infrastructure portlets to handle those.

The access control component 32 provides the capability to define application roles that can be described as collections of permissions related to a base application 34. In FIG. 3, the application role "Visitor", e.g., contains the permissions to use the pages and portlet in application 34, whereas the application role "Moderator" contains edit permissions on the pages and manage permission on the portlet.

In the state of the art, the permissions can disadvantageously only relate to persisted resources, so it is not possible to define application roles for dynamically instantiated applications.

Application roles can be assigned to users or groups, which give them the respective permissions. In the diagram of FIG. 3, the user Alice is assigned to the Visitor application role, and user Bob is assigned to the Moderator application role. The collaborative infrastructure 11 consults the access control component 32 to decide what kinds of operations the current user can perform on a particular application.

The collaborative infrastructure 11 is triggered by the basic rendering and navigation mechanism 38 in the portal server, if the client, usually a browser, requests or interacts with pages that belong to a collaborative application.

With reference to FIG. 4, which is a diagram according to FIG. 3 enriched by references to the essential control flow steps, the prior art control flow of access right management to some dynamically created instance 35 or 36 is as follows:

Step 410

Bob uses his browser to access the instance 35 of the collaborative application 1. The portal rendering and navigation component 38 routes this request to the collaborative infrastructure component 11.

Step 420

The collaborative infrastructure component 11 asks the access control component 32 for Bob's permissions on the instance 35 of the collaborative application 1. As the access control component 32 has no means to store permissions for dynamically created resources, it returns the permissions for the base application, i.e., that one of the base application 34.

Step 430

The collaborative infrastructure component 11 processes the request and displays the instance 35 based on Bob's permissions on the base application 34.

As a person skilled in the art may appreciate, this prior art access control management is insufficient because it does not reflect the basic needs of large enterprises, in which, for example, a large number of application instances are generated per day, wherein all these instances originate from the same basic application. In particular, there must always be at least one user who is granted super-user or administrator rights in order to be able to manage the resources comprised of a respective application instance.

Assume a case in which multiple departments coexist in a single enterprise, for example a financial department, development department, public relations department, etc. In the prior art, one and the same administration user is responsible to manage the instances used of all these different departments. This may generate confidentiality problems because the data visibility cannot be restricted according to individually defined confidentiality guidelines.

SUMMARY OF THE INVENTION

The present invention provides an access right control method which can be adapted to better satisfy individual needs of an enterprise. The prior art access right management process is enriched by the management of an additional attribute which is referred to herein as a "target application instance identifier".

This target application instance identifier is assigned to each http-request against the portal and points to an individual application instance which is accessed by a respective request. In order to manage this identifier the user-to-role mapping facilities existing in prior art are modified according to the invention in order to specify dynamically created application instances in order to explicitly delimit each of such mappings to a respective application instance. During runtime, the prior art access control component is enriched by further program evaluation logic which evaluates this additional information, identifies the target application instance and delivers the application role assignments for a requesting user only with reference to a respective application instance. So, only those application roles that are explicitly scoped to the target application instance are active for the current user request. All other application roles are muted for this request. Thus, basically, different users can have respective different access rights, i.e., privileges in respective different application instances, which were instantiated from the same base application. By this inventional method it is thus possible to configure individual permissions on different instances of the same base application. This can be implemented without creating a respective number of persisted application instances for each needed combination of permissions, and without any complex logic required to hide such permission logic to a requesting user.

Thus, the inventional methods provides the capability to automatically generate access control permissions on a large set of dynamic applications, thereby enhancing the ability to administrate and run a large number of individual applications in such an enterprise.

According to an aspect of the invention, a method and respective system for controlling access rights to dynamically instantiated portal applications in a portal environment are disclosed, wherein new instances of a portal application and respective access control information on resources used in the portal application are generated dynamically from an automated programmed mechanism, such as a template based mechanism, and wherein a user-application role mapping is demanded for the portal application by a respective runtime access control function implemented at the portal environment. The method comprises: assigning an individual user-to-application role mapping to a respective individual one of the created instances of the portal application, for example, in an initialization step, wherein for an incoming request to one of the created instances the runtime access control function checks a target application instance identifier, which identifies an individual application instance desired to be addressed by the incoming request; and granting access rights only based on those application roles which are granted for the target application instance.

By the term "generate dynamically" a way is meant to generate the instances during runtime of the portal server with a limited life time of such instance, such as for example when creating a web conference and using it for half an hour with different participants round the world. Thereafter, the instance is terminated and no essential data of the application instance is persisted in a portal database, except the usual logging data.

Further, advantageously, for a newly created application instance a default higher privileged role such as "administrator", "moderator", etc., including major access rights for editing data items, is proposed for the very user who generates the instance. For other users, lower privileged rules are granted with respective more restricted user access rights, such as, e.g., read-only rights. This increases user comfort, as a useful access right assignment can be done for most cases automatically without manual intervention.

Further, the assigning is implemented by persisting the application instance identifier for each principal-to-application role mapping in form of an application scope, i.e., wherein the validity of the mapping is delimited to the actual application instance only, instead of the general composite or collaborative application, as done in prior art.

The assigning can also be implemented by persisting empty application roles that point to a base application role and are scoped, i.e., selectively defined to be delimited to, to a particular application instance identifier. By that they can be assigned to principals only in this application scope.

BRIEF DESCRIPTION OF THE DRAWINGS

The present invention is illustrated by way of example and is not limited by the shape of the figures of the drawings.

FIGS. 7 and 8 show data records sample within an application role table (FIG. 7) and a principle to application role mappings table (FIG. 8).

FIGS. 9 and 10 are representations according to FIGS. 7 and 8 illustrating a second data record sample.

DETAILED DESCRIPTION OF THE INVENTION

Figure 1:
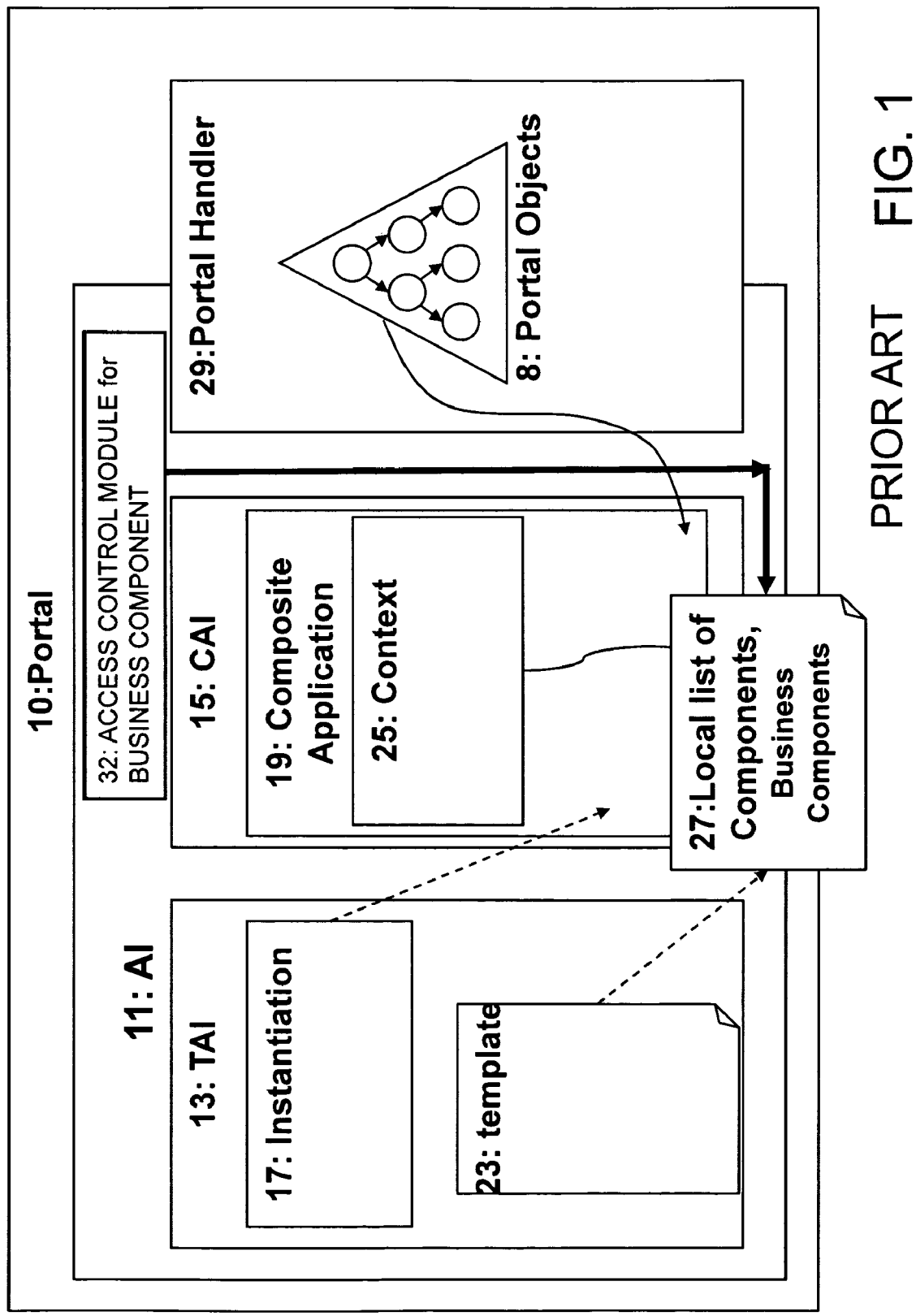
FIGS. 1 and 2 illustrate the most basic structural components of a prior art hardware and software environment used for a prior art method at a portal site.
Figure 2:
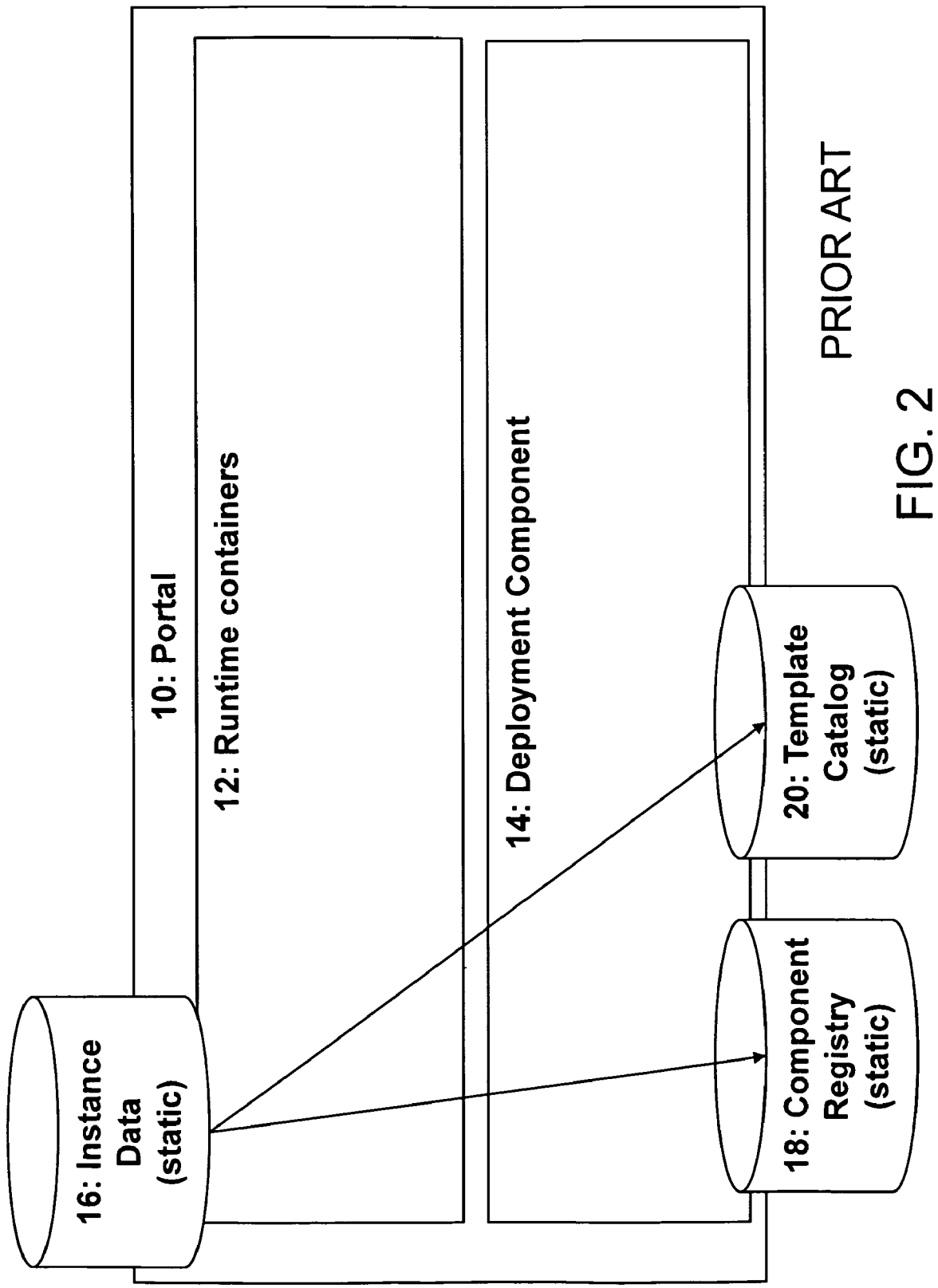
Figure 3:
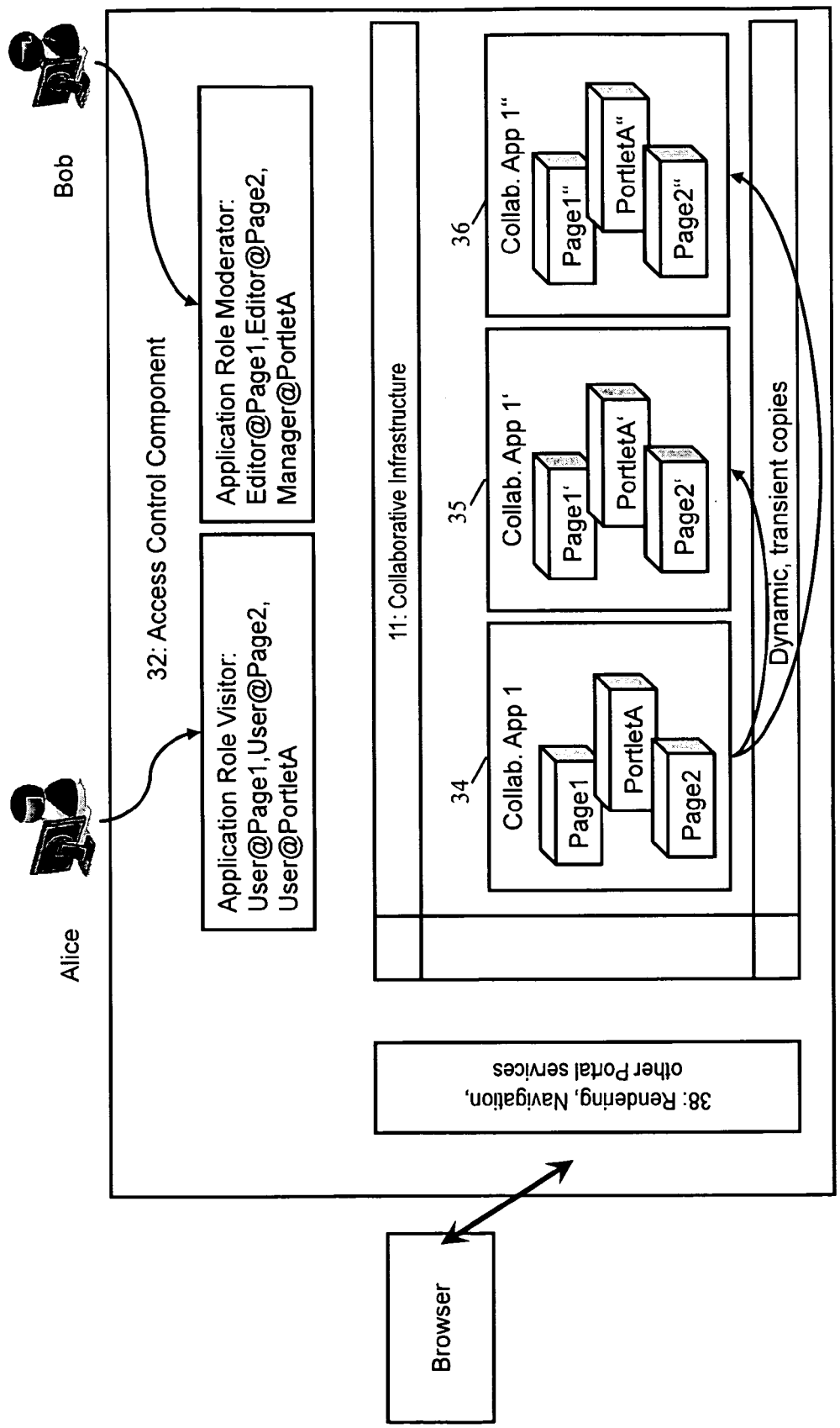
FIG. 3 is a prior art system overview depiction focusing the components involved particularly by the present invention, according to prior art.
Figure 4:
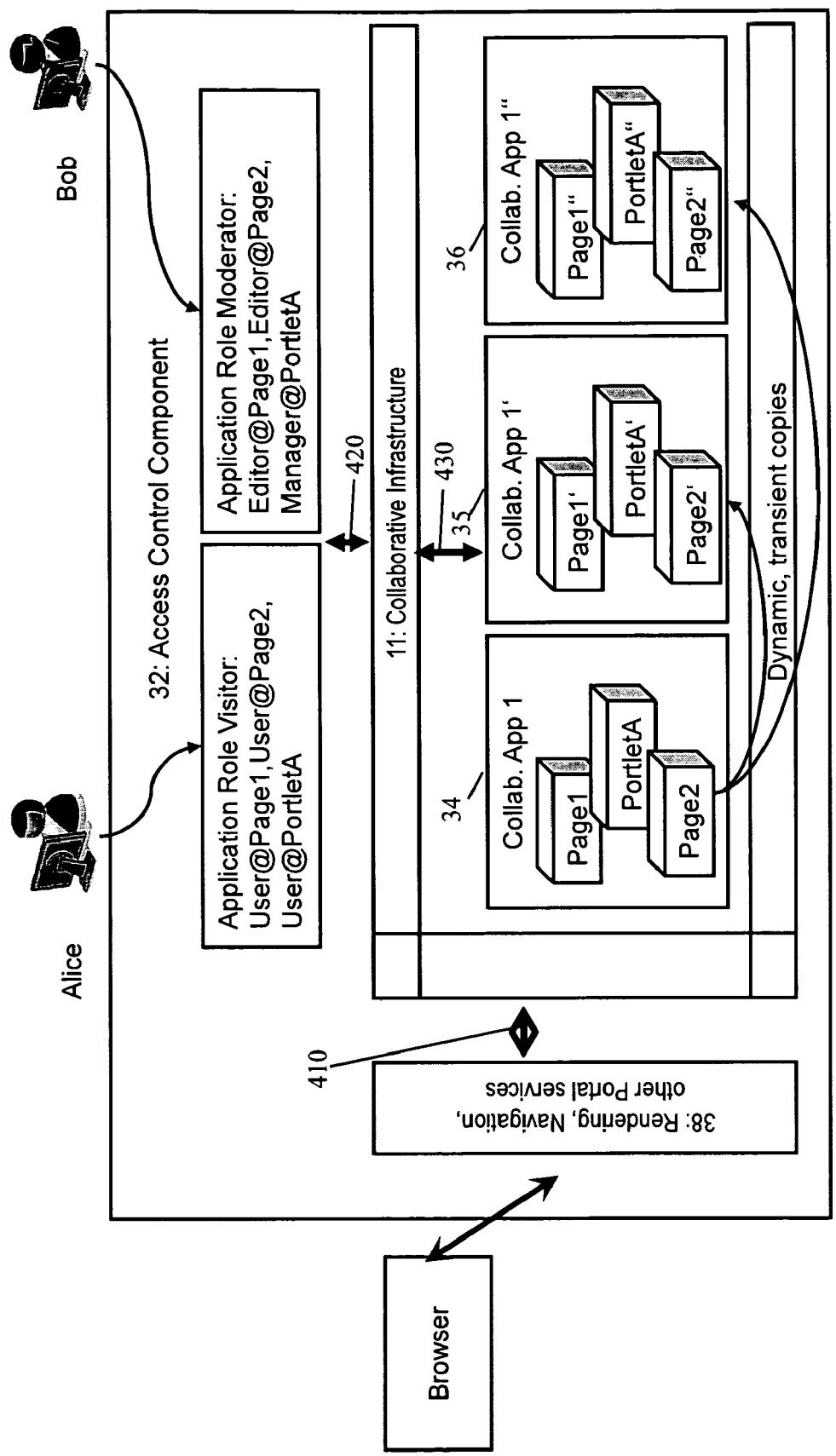
FIG. 4 is a system overview depiction according to FIG. 3, enriched by references to the control flow of the prior art method of access control management.
Figure 5:
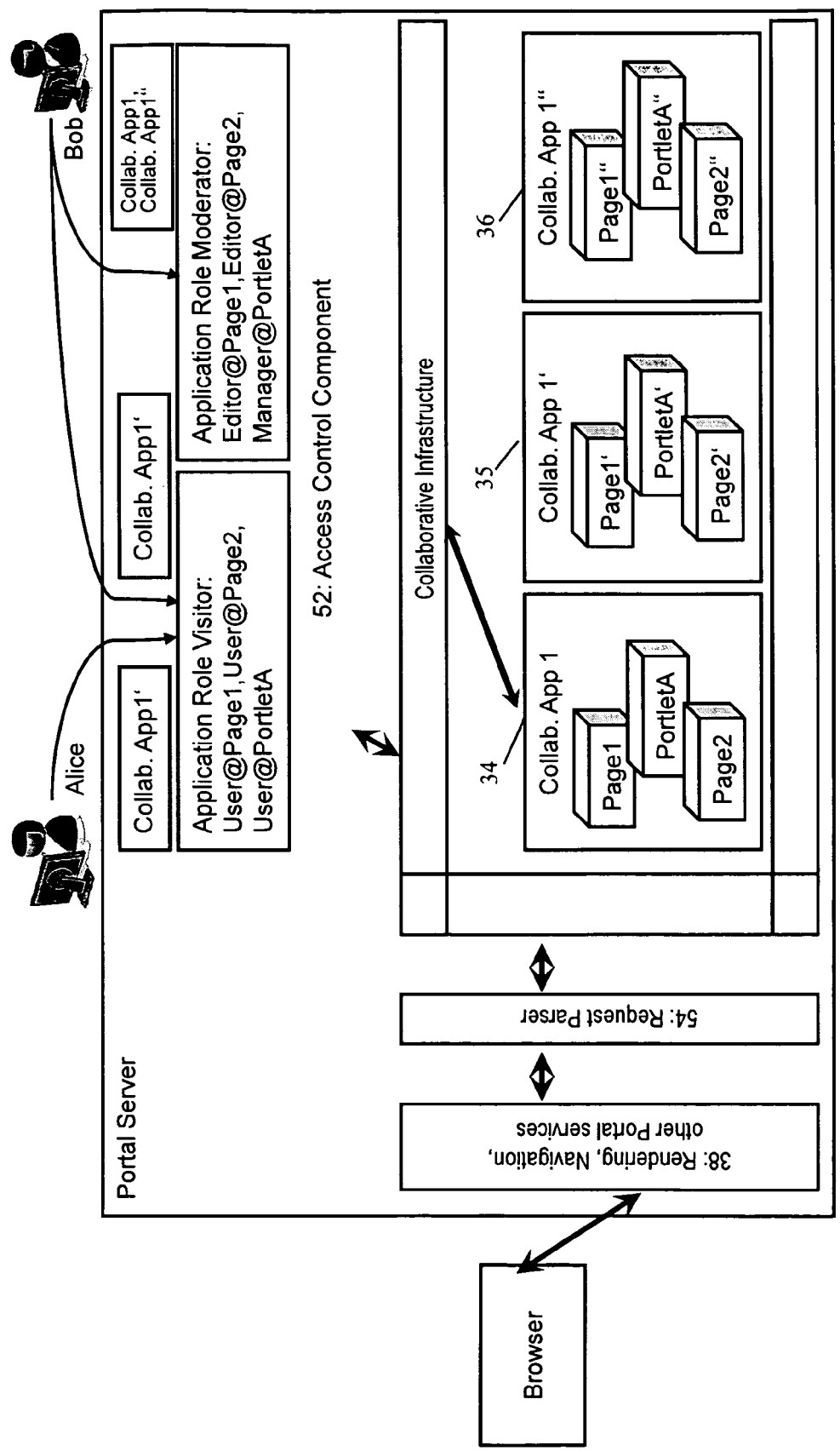
FIG. 5 is a depiction according to FIG. 3, enriched by an inventional component and including an inventional version of access control component.

With general reference to the figures and with special reference now to FIG. 5, according to an embodiment of the inventional method the existing components of prior art are extended as described below.

A request parser 54 is added as a new component to determine the particular target application instance that is addressed in a current request incoming from a browser. The access control component 52 is extended with programmed logic which implements functionality allowing that each mapping from a user or from a group to an application role is delimited to a particular application instance.

Thus, the mapping becomes only valid when one of the correct application instance is addressed by an incoming request.

For example, Bob now has a mapping to the Visitor application role that is only valid for instance 35, and a mapping to the Moderator application role that is valid for the base application 34 and instance 36.

Figure 6:
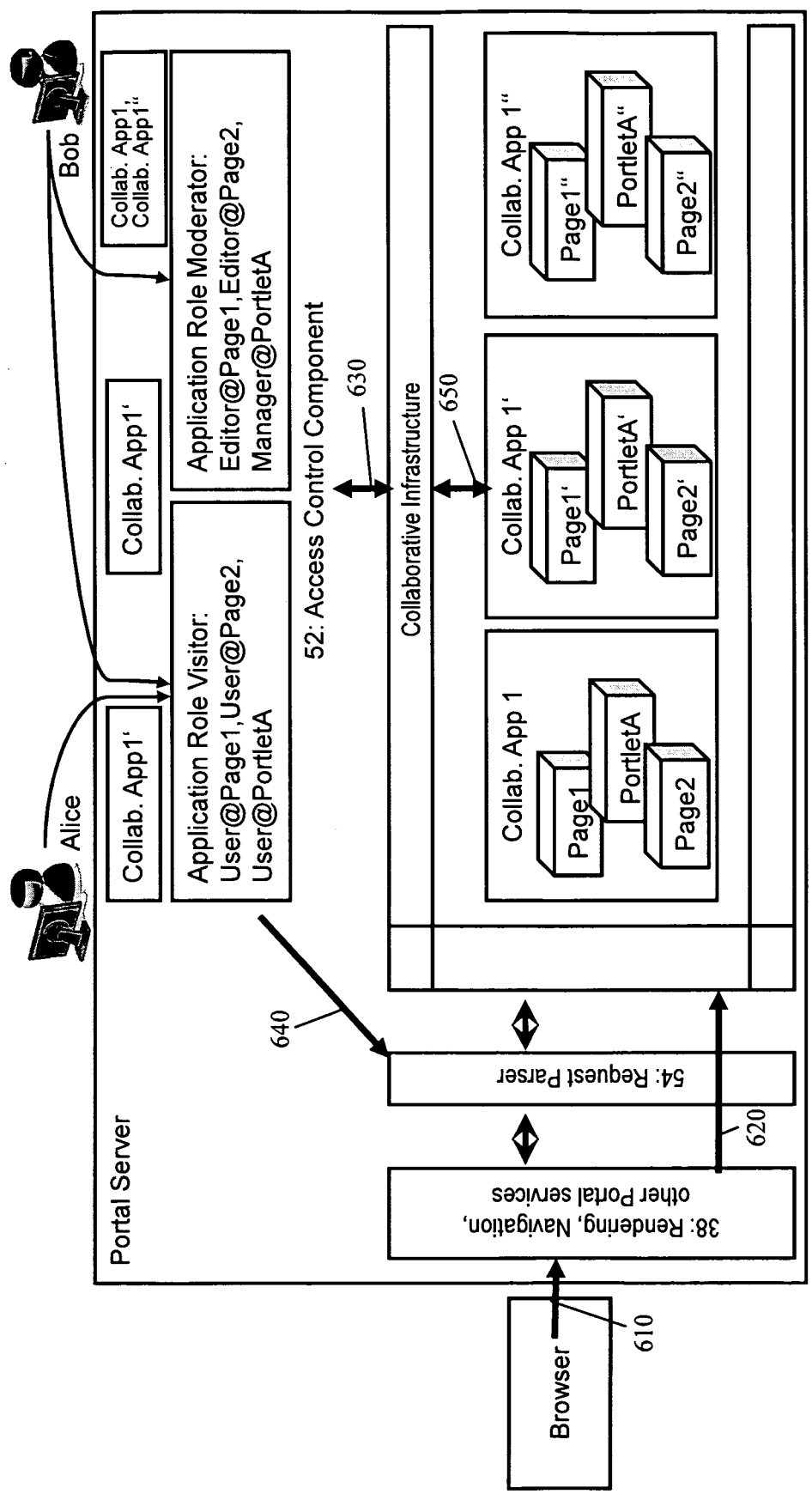
FIG. 6 is a depiction according to FIG. 5, including again references to interactions according to the inventional method.

With reference to FIG. 6 the following interaction steps are performed according to this embodiment of the inventional method:

Step 610

The user Bob uses his browser to access the collaborative application instance 35. Thus, his browser issues a request to the request parser 54.

Step 620

The request processing is extended by parsing the request to identify the application instance which is targeted by the current request. In this case instance 35 is specified.

Step 630

The collaborative infrastructure component 11 asks the access control component 32 for Bob's permissions on instance 35.

Step 640

The access control component 32 asks the request parser 54 for the target application instance. As any role mappings are now delimited to particular application instances, the access control component is able to consider only those role mappings that are valid for instance 35, for example. For user Bob this is a visitor application role in this case.

Step 650

The collaborative infrastructure component 11 processes the request and displays the instance 35 based on the permissions that have been explicitly defined for user Bob and for this particular dynamic application instance.

FIGS. 7 and 8 give further implementational details on how the access control component 32 may store the relevant new information according to a first preferred way.

FIGS. 7 and 8 give some details of how the existing data structure can be extended to realize the logic introduced by the invention. Both the application roles and the principal-to-application role mappings data structures already exist in the state of the art. Application roles are basically described by their name and the list of portal permissions they contain. This structure remains unchanged in the implementation variant of FIGS. 7 and 8.

The principal-to-application role mappings in the state of the art are described by tuples of an application role (name) and a principal. For this variant of the inventional method this tuple is extended to a triple including the ID 80 of the target application instance that additionally defines the application instance scope for the mapping such as described previously. This limiting ID 80 limits for example the mapping for Alice and the Visitor application role only to be valid in the context of Collab App 1', i.e., instance 35.

FIGS. 9 and 10 show a further implementational variant for the inventional method, again with respect to how to store the inventional information.

In this case, the principal-to-application role mappings remain unchanged, and the application role data structure is extended by a base application role and an application instance limitation referred to as "application scope" attribute 90. With this variant, each dynamically instantiated application gets its own copies of the application roles in the base application, e.g., Visitor' and Moderator' for Collab. App 1', instance 35. These copies are represented as empty application roles that do not contain any portal permission, but define them implicitly by pointing to the base application role. Additionally, the application scope is needed to specify for which application instance the application role is valid. For example, the application role 'Visitor' points to the Visitor base application role and thus contains the equivalent permissions related to Collab App 1', instance 35, i.e., User@Page1', User@Page2', User@PortletA'. In the principal-to-application role mappings structure the mappings are now defined for the "scoped" application roles, so, e.g., Alice is directly assigned the Visitor' application role.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method comprising:
controlling access rights to dynamically instantiated portal applications in a portal environment, wherein new instances of a portal application and respective access control information on resources used in the instantiated portal application are generated dynamically from an automated programmed mechanism, and wherein a user-application role mapping is demanded for the instantiated portal application by a respective runtime access control function implemented at the portal environment, the controlling including:
assigning an individual user-to-application role mapping to a respective individual one of the generated instances of the portal application,
wherein for each incoming user request to one of the generated instances the runtime access control function checks a target application instance identifier which identifies an individual application instance desired to be addressed by the incoming request; and
granting access rights to incoming user requests according to application roles as they are defined for the target application instance,
wherein the access rights are granted based only on the application roles as they are defined for the target application instance.

2. The method according to claim 1, wherein for a newly generated application instance a default higher privileged role is proposed for the user who generates the instance, whereas for other users lower privileged roles are granted.

3. The method according to claim 1, wherein the instantiated portal application is a composite application.

4. The method according to claim 1, wherein the assigning is implemented by persisting the application instance identifier for each principal-to-application role mapping.

5. The method according to claim 1, wherein the assigning is implemented by persisting empty application roles that point to a base application role and are scoped to a particular application instance identifier.

6. The method of claim 1, further comprising muting all application roles not defined for the target application instance.

7. The method of claim 1, wherein the target application instance identifier is assigned to each of a plurality of http-requests against the instantiated portal application.

8. An electronic data processing system configured to perform processes comprising:

controlling access rights to dynamically instantiated portal applications in a portal environment, wherein new instances of a portal application and respective access control information on resources used in the instantiated portal application are generated dynamically from an automated programmed mechanism, and wherein a user-application role mapping is demanded for the instantiated portal application by a respective runtime access control function implemented at the portal environment, the controlling including:

assigning an individual user-to-application role mapping to a respective individual one of the generated instances of the portal application, wherein for each incoming user request to one of the generated instances the runtime access control function checks a target application instance identifier, which identifies an individual application instance desired to be addressed by the incoming request;

granting access rights to incoming user requests according to the application roles as they are defined for the target application instance, wherein the access rights are granted based only on the application roles as they are defined for the target application instance; and muting all application roles not defined for the target application instance.

9. The electronic data processing system of claim 8, wherein the target application instance identifier is assigned to each of a plurality of http-requests against the instantiated portal application.

10. A computer program product loaded on a non-transitory computer readable medium, which when executed, performs a process comprising:

controlling access rights to dynamically instantiated portal applications in a portal environment, wherein new instances of a portal application and respective access control information on resources used in the instantiated portal application are generated dynamically from an automated programmed mechanism, and wherein a user-application role mapping is demanded for the instantiated portal application by a respective runtime access control function implemented at the portal environment, the controlling including:

assigning an individual user-to-application role mapping to a respective individual one of the generated instances of the portal application, wherein for each incoming user request to one of the generated instances the runtime access control function checks a target application instance identifier, which identifies an individual application instance desired to be addressed by the incoming request;

granting access rights to incoming user requests according to the application roles as they are defined for the target application instance, wherein the access rights are granted based only on the application roles as they are defined for the target application instance; and muting all application roles not defined for the target application instance.

11. The computer program product of claim 10, wherein the target application instance identifier is assigned to each of a plurality of http-requests against the instantiated portal application.

* * * * *